United States Patent
Lakshminarayan et al.

(10) Patent No.: US 7,428,550 B2
(45) Date of Patent: Sep. 23, 2008

(54) SYSTEMS AND METHODS FOR ESTIMATING THE NUMBER OF UNIQUE ATTRIBUTES IN A DATABASE

(75) Inventors: Choudur Lakshminarayan, Leander, TX (US); Michael Heytens, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 607 days.

(21) Appl. No.: 10/928,408

(22) Filed: Aug. 27, 2004

(65) Prior Publication Data

US 2006/0047683 A1    Mar. 2, 2006

(51) Int. Cl.
G06F 17/00 (2006.01)
(52) U.S. Cl. ..................................... 707/102
(58) Field of Classification Search ............... 707/1–10, 707/100–104.1, 200–205
See application file for complete search history.

(56) References Cited

U.S. PATENT DOCUMENTS 6,477,534 B1 * 11/2002 Acharya et al. ............. 707/100
2003/0084043 A1 * 5/2003 Acharya et al. ................ 707/5

OTHER PUBLICATIONS

Peter J. Haas, Jeffrey F. Naughton, S. Seshadri, Lynne Stokes; "Sampling-Based Estimation of the Number of Distinct Values of an Attribute", Proceedings of the 21st VLDB Conference, Zurich, Switzerland, 1995.

* cited by examiner

*Primary Examiner*—Hosain T Alam
*Assistant Examiner*—Navneet K Ahluwalia

(57) ABSTRACT

Systems and methods for estimating the number of unique attributes in a database are disclosed that can include generating a first estimate of the unique values of an attribute using a data sample; generating a second estimate of the unique values of the attribute in the data sample; forming a weighted first estimate; forming a weighted second estimate; and combining the weighted first and second estimates to form a final estimate.

23 Claims, 4 Drawing Sheets

| a | b | w | mad_uj | mad_sh | mad_lwc |
|---|---|---|---|---|---|
| 1 | 2 | | 30.56 | 91.96 | 1.5 |
| 1 | 4 | | 33.12 | 133.24 | 4.38 |
| 1 | 6 | | 35.91 | 137.41 | 1.08 |
| 1 | 8 | | 37.42 | 126.39 | 5.68 |
| 1 | 10 | | 39.31 | 102.99 | 12.51 |
| 1 | 12 | | 40.6 | 86.12 | 16.69 |

FIG. 4

Experimental Results, 1% sample of Census 2000 data

| Geo1pct | uec_samp | uec_pop | skew | w | uec_uj | | uec_sh | | uec_lwc | |
|---|---|---|---|---|---|---|---|---|---|---|
| state | 52 | 52 | −1 | 0.1 | 52 | 0.0% | 52 | 0.0% | 52 | 0.0% |
| fileid | 1 | 1 | 0 | 0.0 | 1 | 0.0% | 1 | 0.0% | 1 | 0.0% |
| geocomp | 30 | 33 | −1 | 0.1 | 30 | 9.1% | 93 | 181.8% | 36 | 9.1% |
| charter | 1 | 1 | 0 | 0.0 | 1 | 0.0% | 1 | 0.0% | 1 | 0.0% |
| cifsn | 1 | 1 | 0 | 0.0 | 1 | 0.0% | 1 | 0.0% | 1 | 0.0% |
| sumlev | 53 | 61 | −1 | 0.1 | 53 | 13.1% | 91 | 49.2% | 57 | 7.2% |
| pop100 | 5069 | 33973 | −0.38 | 0.0 | 5209 | 84.7% | 80713 | 137.6% | 6291 | 81.5% |
| hu100 | 3211 | 22915 | −0.98 | 0.1 | 3259 | 85.8% | 36704 | 60.2% | 6322 | 72.4% |
| areawatr | 8561 | 312705 | −1.04 | 0.1 | 9378 | 97.0% | 821024 | 162.6% | 92585 | 70.4% |
| arealand | 75037 | 2342885 | 2.93 | 0.6 | 218224 | 90.7% | 5146286 | 119.7% | 3057766 | 30.5% |
| name | 9162 | 133831 | 10.28 | 1.0 | 9764 | 92.7% | 163020 | 21.8% | 163016 | 21.8% |
| logrecno | 82125 | 750624 | 2.18 | 0.378264 | 312025 | 58.4% | 6166177 | 721.5% | 2526441 | 236.6% |
| KEY | 95036 | 9541315 | | | | 44.29% | | 121.19% | | 44.12% |

Experimental Results, 5% sample of Census 2000 data

| Geo1pct | uec_samp | uec_pop | skew | w | uec uj | | uec sh | | uec lwc | |
|---|---|---|---|---|---|---|---|---|---|---|
| fileid | 1 | 1 | 0 | 0.0 | 1 | 0.0% | 1 | 0.0% | 1 | 0.0% |
| state | 52 | 52 | -1 | 0.1 | 52 | 0.0% | 52 | 0.0% | 52 | 0.0% |
| sumlev | 60 | 61 | -1 | 0.1 | 58 | 4.9% | 66 | 8.2% | 59 | 3.7% |
| geocomp | 32 | 33 | -1 | 0.1 | 32 | 3.0% | 33 | 0.0% | 32 | 2.7% |
| chariter | 1 | 1 | 0 | 0.0 | 1 | 0.0% | 1 | 0.0% | 1 | 0.0% |
| cifsn | 1 | 1 | 0 | 0.0 | 1 | 0.0% | 1 | 0.0% | 1 | 0.0% |
| pop100 | 10433 | 33973 | -0.96 | 0.1 | 10522 | 69.0% | 33970 | 0.0% | 12586 | 63.0% |
| hu100 | 6462 | 22915 | -1 | 0.1 | 6499 | 71.6% | 22269 | 2.8% | 8000 | 65.1% |
| areawatr | 39104 | 312705 | -1.05 | 0.1 | 42035 | 86.6% | 636415 | 103.5% | 104082 | 66.7% |
| arealand | 271608 | 2342885 | 4.8 | 0.9 | 471895 | 79.9% | 2869618 | 22.5% | 2630185 | 12.3% |
| name | 26368 | 133831 | 9.07 | 1.0 | 27307 | 79.6% | 189719 | 41.8% | 189676 | 41.7% |
| logrecno | 263255 | 750624 | 2.57 | 0.5 | 368176 | 51.0% | 1817658 | 142.2% | 1068858 | 42.4% |
| KEY | 476955 | 9541315 | | | | 40.51% | | 29.18% | | 27.05% |

FIG. 7

Experimental Results, 10% sample of Census 2000 data

| Geo1pct | uec_samp | uec_pop | skew | w | uec uj | | uec sh | | uec lwc | |
|---|---|---|---|---|---|---|---|---|---|---|
| fileid | 1 | 1 | 0 | 0.0 | 1 | 0.0% | 1 | 0.0% | 1 | 0.0% |
| state | 52 | 52 | -1 | 0.1 | 52 | 0.0% | 52 | 0.0% | 52 | 0.0% |
| sumlev | 60 | 61 | -1 | 0.1 | 60 | 1.6% | 65 | 6.6% | 60 | 0.9% |
| geocomp | 33 | 33 | -1 | 0.1 | 33 | 0.0% | 33 | 0.0% | 33 | 0.0% |
| chariter | 1 | 1 | 0 | 0.0 | 1 | 0.0% | 1 | 0.0% | 1 | 0.0% |
| cifsn | 1 | 1 | 0 | 0.0 | 1 | 0.0% | 1 | 0.0% | 1 | 0.0% |
| pop100 | 14091 | 33973 | -0.98 | 0.1 | 14169 | 58.3% | 34508 | 1.6% | 16031 | 52.8% |
| hu100 | 9054 | 22915 | -1 | 0.1 | 9091 | 60.3% | 26304 | 14.8% | 10729 | 53.2% |
| areawatr | 71274 | 312705 | -1.04 | 0.1 | 75439 | 75.9% | 509880 | 63.1% | 119976 | 61.6% |
| arealand | 467537 | 2342885 | 6.01 | 1.0 | 710615 | 69.7% | 2730046 | 16.5% | 2675526 | 14.2% |
| name | 41330 | 133831 | 7.5 | 1.0 | 42377 | 68.3% | 183325 | 37.0% | 182817 | 36.6% |
| logrecno | 364488 | 750624 | 2.73 | 0.5 | 424657 | 43.4% | 959116 | 27.8% | 705464 | 6.0% |
| KEY | 954163 | 9541315 | | | | 34.32% | | 15.21% | | 20.48% |

SYSTEMS AND METHODS FOR ESTIMATING THE NUMBER OF UNIQUE ATTRIBUTES IN A DATABASE

BACKGROUND

A database is a collection of information. A relational database is a database that is perceived by its users as a collection of tables. Each table arranges items and attributes of the items in rows and columns respectively. Each table row corresponds to an item (also referred to as a record or tuple), and each table column corresponds to an attribute of the item (referred to as a field, an attribute type, or field type).

To retrieve information from a database, the user of a database system constructs a query. A query contains one or more operations that specify information to retrieve from the database. The system scans tables in the database to execute the query.

A database system can optimize a query by arranging the order of query operations. The number of unique values for an attribute is one statistic that a database system uses to optimize queries. When the actual number of unique values is unknown, a database system can use an estimate of the number of unique attribute values. An accurate estimate of the number of unique values for an attribute is useful in methods for optimizing a query involving multiple join operations. A database system can use the estimate in methods that determine the order in which to join tables. An accurate estimate of the number of unique values for an attribute is also useful in methods that reorder and group items. An estimate computed from a sample is typically used for large tables, rather than an exact count of the unique values, because computing the exact count is too time consuming for large tables.

SUMMARY

Embodiments of systems and methods for estimating the number of unique attributes in a database are disclosed that can include generating a first estimate of the unique values of an attribute using a data sample; generating a second estimate of the unique values of the attribute in the data sample; forming a weighted first estimate; forming a weighted second estimate; and combining the weighted first and second estimates to form a final estimate.

BRIEF DESCRIPTION OF THE DRAWINGS

The accompanying drawings, which are incorporated in and form a part of this specification, illustrate embodiments of the invention and, together with the description, serve to explain its principles:

FIGS. 4, 5, 6, and 7 show tables of results of experiments using Monte-Carlo simulations of an embodiment of an adaptive weighted estimator disclosed herein.

DETAILED DESCRIPTION OF THE DRAWINGS

Several estimators for estimating the number of unique values of an attribute in a database have been proposed in the database and statistics literature. The proposed estimators perform well depending on the degree of "skew" in the data. The term skew refers the variations in the frequencies of the attribute values. Uniform data, or data with "low skew", has nonexistent or small variations. What is desired is an estimator that provides relatively accurate estimates regardless of the skew in the data.

Figure 1:
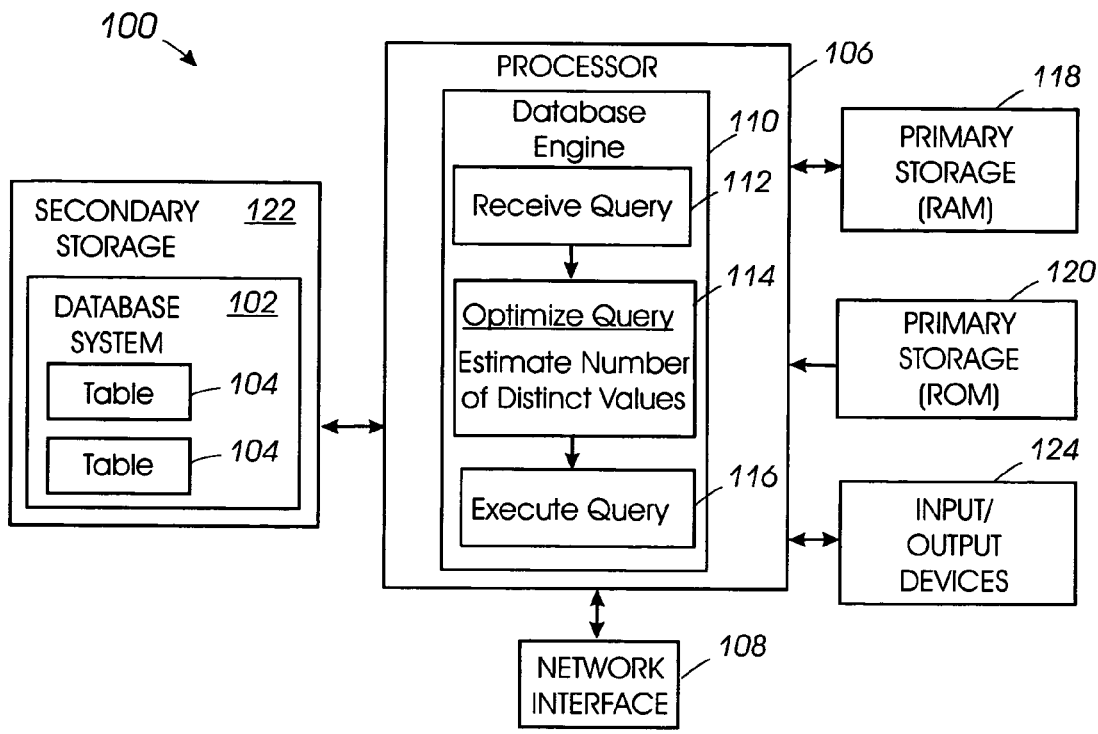
FIG. 1 is a block diagram of a computer system suitable for implementing embodiments of an adaptive weighted estimator disclosed herein.

FIG. 1 shows a diagram of an embodiment of a computer system 100 that is a suitable platform for supporting a database system 102 that includes one or more relational database tables 104. Each table 104 includes a series of entries. Computer system 100 includes one or more processors 106. Multiple processors 106 can be coupled to communicate with one another in a local or wide-area network via network interface 108. A database initially includes a set of relational tables called system catalogs that define tables 104. The catalogs also store statistics, for example, the number of unique values of an attribute for entries in table 104.

Processor 106 can include a database engine 110 that optimizes queries to increase the speed in which information is processed in database tables 104. After the database engine 110 receives a query in sub-process 112, sub-process 114 optimizes the query. One parameter that is important to optimize a query is the number of unique values for an attribute in a table 104. A query optimization process can use the exact number of unique values for a given attribute or obtain an estimate for the number of unique values for an attribute. After optimizing the query, engine 110 executes the query in sub-process 116.

Computer system 100 may be implemented in a variety of configurations such as servers, personal computers, hand-held devices, multi-processor systems, microprocessor-based or programmable consumer electronics, network PCs, network adapters, minicomputers, mainframe computers and the like. Embodiments of the invention may also be practiced in distributed computing environments, where tasks are performed by remote processing devices that are linked through network interface 108. In a distributed computing environment, program modules may be located in both local and remote memory storage devices. Additionally, some embodiments may be implemented as logic instructions and distributed on computer readable media or via electronic signals.

Processor 106 can be a special-purpose device designed specifically to interface with database system 102. In such embodiments, processor 106 can be coupled to communicate with a central processing unit (not shown) that performs other functions and coordinates activities of associated processors, such as processor 106.

Computer system 100 can include any number of memory devices including primary storage devices 118, 120 such as a random access memory (RAM), and read only memory (ROM). ROM acts to transfer data and instructions uni-directionally to processor 106, while RAM is used typically to transfer data and instructions in a bi-directional manner. A specific primary storage device 120 such as a CD-ROM may also pass data uni-directionally to processor 106.

System 100 can also include a secondary storage device 122 coupled for bi-directional communication with processor 106. Secondary storage device 122 typically includes a storage medium with slower read/write access than RAM or ROM. Examples of mass memory devices such as hard disk drives or a tape. Information retained within secondary storage device 120, may, in appropriate cases, be incorporated as part of RAM 118 as virtual memory.

Processor 106 can also be coupled to one or more input/output devices 124 that may include, but are not limited to, devices such as video monitors, track balls, mice, keyboards, microphones, touch-sensitive displays, transducer card readers, magnetic or paper tape readers, tablets, styluses, voice or handwriting recognition systems, and/or other suitable types of devices.

Figure 2:
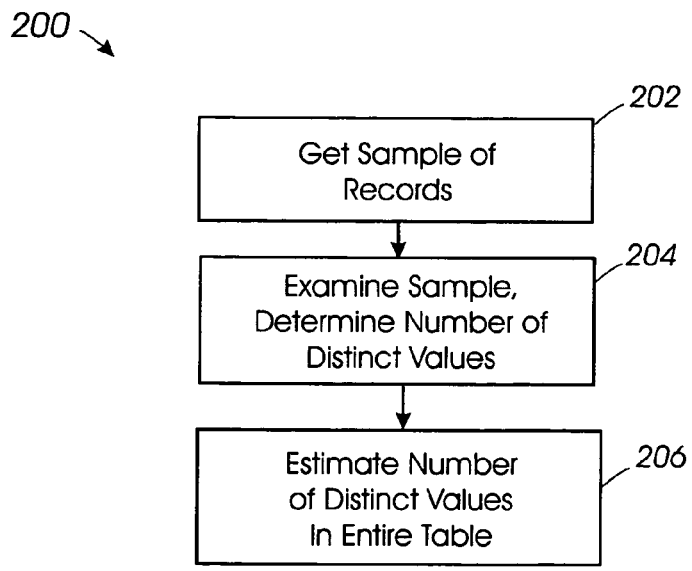
FIG. 2 shows a flow diagram of an embodiment of sub-process for estimating the number of unique values for an attribute.

Referring to FIG. 2, a flow diagram of an embodiment of sub-process 114 for estimating the number of unique values for an attribute begins by retrieving a sample of records from a table 104 (FIG. 1), as indicated by sub-process 202. Generally, database system 102 collects samples at pre-set time intervals or upon demand.

Database engine 110 examines the sample and determines the number of unique values for an attribute in the sample in sub-process 204. Based on the number of unique values in the sample, the system estimates the number of unique values for the attribute in the entire table in sub-process 206.

A variety of estimators have been developed, as outlined in the publication "Sampling-Based Estimation of the Number of Distinct Values of an Attribute", by Peter J. Haas, Jeffrey Naughton, S. Seshadri, and Lynne Stokes, Proceedings of the 21$^{st}$ VLBD Conference, Zurich, Switzerland, 1995, pages 311-332. One type of estimator that can be used to estimate the number of unique values of an attribute in a database is referred to as the jackknife estimator. The conventional "first-order" jackknife estimator is defined by $$\hat{D}_{jack} = d_n \left(1 - \frac{(1-q)f_1}{n}\right)^{-1}$$

where D represents the estimate of the number of unique values of an attribute in a database, dn denotes the number of unique values in the sample, n is the number of tuples in the sample with attribute value j for 1<j<D, q is the sample size, and $f_1$ is the number of values that occur exactly once in the sample. The term "tuples" refers to a data record that contains two or more components. The tuples in the sample are numbered from 1 to n, and for $1 \leq k \leq n$ the number of unique values in the sample after tuple k has been removed are denoted by $d_{n-1}(k)$. Note that $d_{n-1}(k) = d_n - 1$ if the attribute value for tuple k is unique; otherwise, $d_{n-1}(k) = d_n$. Accordingly, $$d_{(n-1)} = (1/n) \sum_{k=1}^{n} d_{n-1}(k).$$

A second-order jackknife estimator can be based on the n quantities $d_{n-1}(1), d_{n-1}(2), \ldots, d_{n-1}(n)$ together with $n(n-1)/2$ additional quantities of the form $d_{n-2}(i,j)$ (i<j), where $d_{n-2}(i,j)$ is the number of unique values in the sample after tuples i and j have been removed.

Another estimator that can be used to estimate the number of unique values of an attribute in a database is referred to as the Schlosser estimator, which can be expressed as:

$$D_{schloss} = d_n + f_1 \frac{\sum_{i=1}^{n}(1-q)^i f_i}{\sum_{i=1}^{n} iq(1-q)^{i-1} f_i}$$

where $q = \frac{n}{N}$, n is the sample size, N is the population size, and $f_i$ is the number of values that occur exactly "i" times in the sample. The Schlosser estimator assumes that each tuple is included in the sample with probability q=n/N, independently of all other tuples.

The accuracy of an estimator can depend on the skew of the data. For example, the jackknife estimator provides good estimates with data that has low skew but not high skew. In contrast, the Schlosser estimator provides good estimates when the data has high skew, but not low skew. Accordingly, it is desirable to provide a system that is able to automatically provide accurate estimates of the value of an attribute regardless of the skew of the data.

Figure 3:
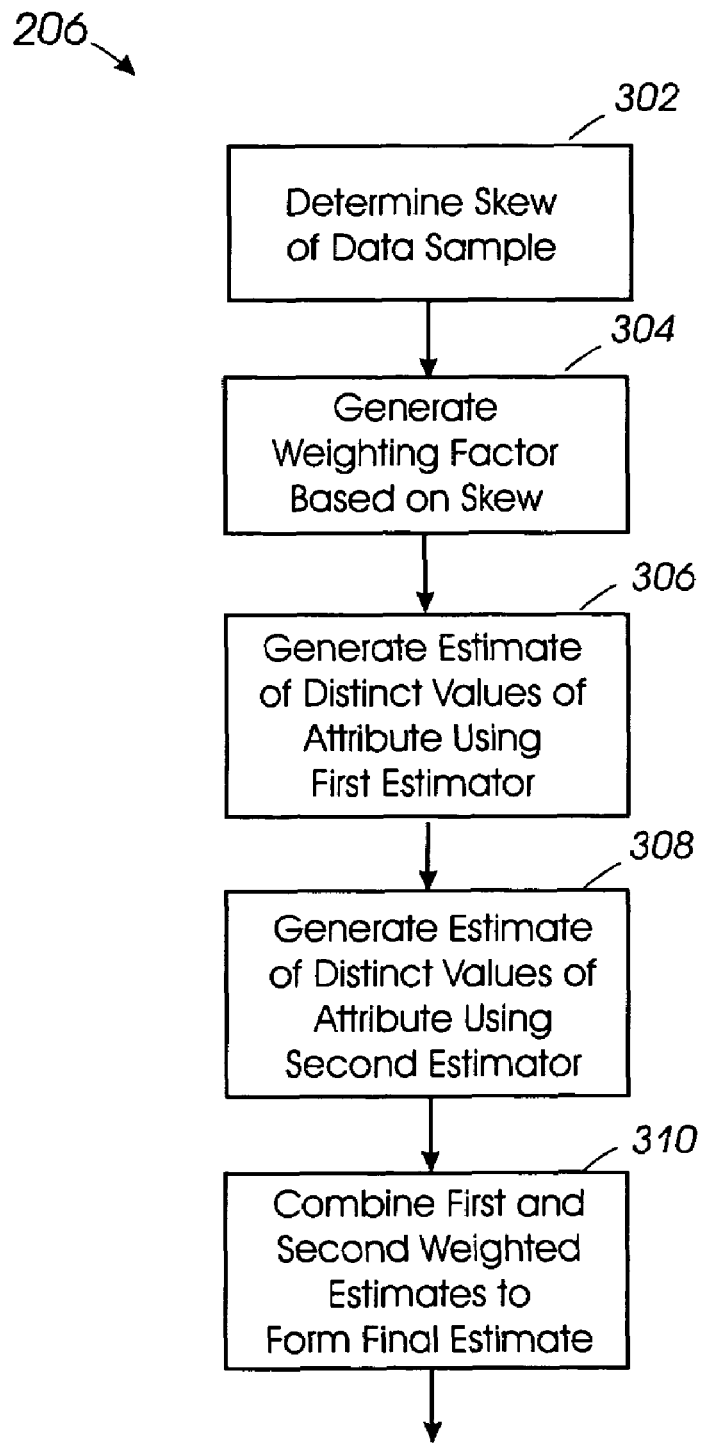
FIG. 3 shows a flow diagram of an embodiment of process for estimating the number of unique values of an attribute in a table.

FIG. 3 shows a flow diagram of an embodiment of process 206 for estimating the number of unique values of an attribute in a table 104 (FIG. 1) that weights different estimators based on the data skew, and the accuracy of each estimator for data with a particular skew value. Process 206 adaptively estimates the number of unique attributes in a population using a weighted linear combination of two or more estimators based on skew. In this embodiment, linear combination of estimators was limited to two estimators only. Sub-process 302 determines the skew (U) for a data sample with n values $X_i$, a mean value X', and standard deviation σ. In some embodiments, skew can be determined as follows:

$$U = [n/(n-1)(n-2)] \sum_{i=1}^{n} [(X_i - X')/\sigma]^3$$

The above expression shows that values much larger than the mean will tend to make the expression for skew positive whereas values much smaller than the mean will tend to make the expression negative.

A weighting factor based on the skew is generated in sub-process 304. In some embodiments, the expression used to determine the weighting factor w is:

$$w = 1 - a\, e^{(-bU^{**2})}$$

where a and b are shaping parameters that can be varied for a particular application. In some embodiments, a is set to 1 and the parameter b is set to 0.1. Other suitable values for a and b can be used, depending on the combination of estimators utilized and the weight to be applied to each estimator. In other embodiments, the following expression for the weighting factor can be used:

$$w = 1/(1+U^2).$$

The value of the weighting factor w resulting from the above expressions is typically a number between 0 and 1, and is based on the degree of skew. The weighting factor w is designed to weight the estimator that is most accurate for a particular level of skew more heavily than the other estimator(s). Other suitable expressions for the weighting factor w based on skew U can be utilized.

Sub-process 306 includes generating an estimate of the value of the attribute using a first estimator. Sub-process 308 includes generating an estimate of the value of the attribute using the second estimator. Sub-process 310 includes applying the weighting factor w to the first estimate, and the factor (1−w) to the second estimate, and combining the weighted terms. For example, in some embodiments, estimates from the Schlosser and the first or second order jackknife estimators are combined in an adaptive weighted estimator (awe) as:

$$D_{awe} = w*D_{jack} + (1-w)*D_{Schloss}.$$

FIGS. 4, 5, 6, and 7 show tables of results of experiments using Monte-Carlo simulations of an adaptive weighted estimator with a Schlosser and a first order unsmoothed jackknife estimator for various sample fractions. FIG. 4 shows Monte Carlo simulation results for a data table with 5000 rows and a sample size of 10%, or 500 rows. The data was generated synthetically using an analysis system from SAS Institute, Inc. of Cary, N.C. Attribute values were drawn from the Gamma(a,b) distribution, where "a" is the shape and "b" the scale. The number of simulations was 200. The labels on the columns represent the following values:

- mad_uj: unsmoothed jackknife mean absolute deviation of predicted number of unique values compared to actual number of unique values;
- mad_sh: Schlosser mean absolute deviation of predicted number of unique values compared to actual number of unique values; and
- mad_lwc: linear weighted combination mean absolute deviation of predicted number of unique values compared to actual number of unique values.

The results of the simulations in FIG. 4 show that the weighted estimator consistently yields higher precision on average for any given sampling fractions under various skew conditions than either of the estimators alone. The adaptive weighted estimator adapts to the skew in the data and weights the appropriate estimator that performs best to a particular level of skew, i.e., the jackknife estimator for data with low skew and the Schlosser estimator for data with high skew.

FIGS. 5, 6, and 7 show test results based on data from the United States census for the year 2000. FIG. 5 represents a 1% sample size of the data; FIG. 6 represents a 5% sample; and FIG. 7 represents a 10% sample of the census data. The labels across the top row of the tables in FIGS. 5, 6, and 7 represent the following items:

| | |
|---|---|
| uec_samp | unique entry count (unique attribute values) of the sample |
| uec_pop | unique entry count of the database population |
| skew | the variation in the frequencies of the attribute values |
| w | weighting factor |
| uec_uj | unique entry count unsmoothed jackknife estimate |
| uec_sh | unique entry count Schlosser estimate |
| uec_lwc | unique entry count weighted combination of jackknife and Schlosser |

The test results in FIGS. 5, 6, and 7 again show that the weighted estimator consistently yields higher precision on average for any given sampling fractions under various skew conditions than either of the estimators alone.

It is anticipated that embodiments using a weighted combination of two or more different estimators can be utilized. The formula for determining the weighting factor w based on skew could be adapted to accommodate a combination of more than two estimators. The combination of estimators can include estimators that provide accurate results at low, medium, and/or high skew, depending on requirements for a particular situation.

The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed:

1. An apparatus comprising:
    a computer storage medium having computer readable program code embodied therein operable to:
        determine the skew (U) of the data sample;
        generate a first estimate of the number of unique values of an attribute in a data sample using a first estimator;
        generate a second estimate of the number of unique values of the attribute in the data sample using a second estimator;
        generate a weighted first estimate based on a weighting factor, the skew, and the first estimate;
        generate a weighted second estimate based on the weighting factor, the skew, and the second estimate;
        combine the weighted first and second estimates to form a final estimate.

2. The apparatus of claim 1, wherein the first factor w is determined by the expression: $w = 1 - a\, e^{(-bU^{**2})}$, where U is the skew of the data sample, and a and b are shaping parameters.

3. The apparatus of claim 1, wherein the weighting factor w is determined by the expression: $w = 1/(1+U^2)$, where U is the skew of the data sample.

4. The apparatus of claim 1, wherein the first estimator is a jackknife estimator.

5. The apparatus of claim 1, wherein the second estimator is a Schlosser estimator.

6. The apparatus of claim 1, wherein the expression that includes the weighting factor is (1−w).

7. The apparatus of claim 1, further comprising:
    logic instructions operable to:
        optimize a query of a database based on the final estimate.

8. The apparatus of claim 1, further comprising:
    logic instructions operable to:
        collect samples of the values of the attribute; and
        determine the number of unique values of the attribute in the samples.

9. The apparatus of claim 1, further comprising:
a processor configured to execute the logic instructions.

10. The apparatus of claim 1, wherein the logic instructions are implemented as software instructions stored on a computer-readable storage medium.

11. The apparatus of claim 1, wherein the first estimator generates accurate estimates for data with low skew.

12. The apparatus of claim 1, wherein the second estimator generates accurate estimates for data with high skew.

13. A method comprising:
determining the skew (U) of a data sample;
generating a first estimate of the number of unique values of an attribute using the data sample;
generating a second estimate of the number of unique values of the attribute in the data sample;
applying a weighting factor based on the skew to the first estimate to form a weighted first estimate;
applying an expression that includes the weighting factor to the second estimate to form a weighted second estimate; and
combining the weighted first and second estimates to form a final estimate.

14. The method of claim 13, wherein the weighting factor w is determined by the expression: $w = 1 - a\, e^{(-bU^{**2})}$, where U is the skew of the data sample, and a and b are shaping parameters.

15. The method of claim 13, wherein the weighting factor w is determined by the expression: $w = 1/(1+U^2)$ where U is the skew of the data sample.

16. The method of claim 13, wherein the first estimate is based on a jackknife estimator.

17. The method of claim 13, wherein the second estimate is based on a Schlosser estimator.

18. The method of claim 13, wherein the expression that includes the weighting factor is $(1-w)$.

19. The method of claim 13, further comprising:
optimizing a query of a database based on the final estimate.

20. The method of claim 13, further comprising:
collecting samples of the values of the attribute; and
determining the number of unique values of the attribute in the samples.

21. An apparatus including a computer processor comprising:
means for:
determining the skew (U) of a data sample;
generating a first estimate of the number of unique values of an attribute in the data sample;
generating a second estimate of the number of unique values of the attribute in the data sample;
generating a weighted first estimate based on the skew and the first estimate;
generating a weighted second estimate based on the skew and the second estimate; and
combining the weighted first and second estimates to form a final estimate.

22. A method for forming an estimate of the number of unique values of an attribute, comprising:
generating a first estimate of the number from a sample of data of a database using a first estimator that generated accurate estimates for data with skew below a predetermined value;
generating a second estimate of the number from the sample using a second estimator that generates accurate estimates for data with skew above the predetermined value;
generating a weighting factor based on the skew of the data of the database; and
generating a hybrid estimate by combining the first estimate and the second estimate using the weighting factor.

23. The method of claim 22 wherein the combining is linear.

* * * * *

UNITED STATES PATENT AND TRADEMARK OFFICE
CERTIFICATE OF CORRECTION

PATENT NO.         : 7,428,550 B2
APPLICATION NO. : 10/928408
DATED               : September 23, 2008
INVENTOR(S)       : Choudur Lakshminarayan et al.

It is certified that error appears in the above-identified patent and that said Letters Patent is hereby corrected as shown below:

On the Title Page, Item (54), in "Title", line 3, delete "ATTRIBUTES" and insert -- ATTRIBUTE VALUES --, therefor.

In column 1, line 3, delete "ATTRIBUTES" and insert -- ATTRIBUTE VALUES --, therefor.

In column 3, line 41, delete "dn" and insert -- $d_n$ --, therefor.

Signed and Sealed this

Twenty-eighth Day of July, 2009

JOHN DOLL
*Acting Director of the United States Patent and Trademark Office*